US010649921B2

(12) United States Patent
York et al.

(10) Patent No.: US 10,649,921 B2
(45) Date of Patent: May 12, 2020

(54) COMPOSABLE SERIAL CONSOLE AND KVM WITH REMOTE ACCESSIBILITY

(71) Applicant: HEWLETT PACKARD ENTERPRISE DEVELOPMENT LP, Houston, TX (US)

(72) Inventors: Justin York, Cypress, TX (US); Darrin S. Rawls, Magnolia, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 16/048,539

(22) Filed: Jul. 30, 2018

(65) Prior Publication Data

US 2020/0034314 A1    Jan. 30, 2020

(51) Int. Cl.
*G06F 13/12*        (2006.01)
*G06F 13/40*        (2006.01)

(52) U.S. Cl.
CPC .......... *G06F 13/12* (2013.01); *G06F 13/4022* (2013.01); *G06F 2213/0002* (2013.01)

(58) Field of Classification Search
CPC .............................. G06F 13/4022; G06F 13/12
See application file for complete search history.

(56) References Cited

U.S. PATENT DOCUMENTS

| | | | |
|---|---|---|---|
| 7,555,567 B2 | 6/2009 | Thomas et al. | |
| 9,459,928 B2 | 10/2016 | Bonola et al. | |
| 2010/0077055 A1* | 3/2010 | Cohen | G06F 3/023 709/213 |
| 2017/0054603 A1 | 2/2017 | Kulkarni et al. | |
| 2017/0332509 A1* | 11/2017 | Miyatsu | G06F 1/18 |
| 2018/0337991 A1* | 11/2018 | Kumar | H04L 41/0803 |

OTHER PUBLICATIONS

Chung, I. et al.: "Towards a Composable Computer System"; Jan. 28-31, 2018; 11 pages.
Li, C. et al.; "Composable Architecture for Rack Scale Big Data Computing"; Jul. 21, 2016; 33 pages.
Morgan, T.; "Future Interconnects: Gen-z Stitches a Memory Fabric"; Sep. 5, 2017; 6 pages.
Putnam A. et al.; "A Reconfigurable Fabric for Accelerating Large-scale Datacenter Services"; Nov. 2016; 9 pages.

* cited by examiner

*Primary Examiner* — Zachary K Huson
(74) *Attorney, Agent, or Firm* — Nolte Intellectual Property Law Group

(57) ABSTRACT

A slot-based component provides remote serial console and KVM capability to all slots in a sled by allocating dedicated memory space in a serial console component for serial console and KVM data. The dedicated memory space is in communication with a memory semantic fabric switch that is in communication all slots on the fabric. Other components on the fabric have corresponding allocated memory in communication with onboard CPU's. When remote access is conducted the CPU receives and pushes data to the allocated memory and the data is pulled through the fabric switch to the serial console component to be provided to a remote client session.

19 Claims, 10 Drawing Sheets

COMPOSABLE SERIAL CONSOLE AND KVM WITH REMOTE ACCESSIBILITY

BACKGROUND OF THE INVENTION

Modern computer systems have been designed and built around long-standing philosophy that memory components are fast and network and storage components are relatively slow. Further, the communication protocols for memory, storage, and network components are generally incompatible and require multiple layers of software at the interfaces to translate memory commands into storage and network commands and vice versa. Therefore, commands and data in a computer system spend significant time traversing and translating from each bus, fabric, or network to access processor memory. In response to these communication challenges, the computing industry has developed a memory-semantic communication model called Gen-Z that allows commands and data to freely move between memories located on different components via a unified communication path. Gen-Z is a consortium generated memory-semantic communication model that overcomes interface communication challenges and provides opportunity for high performance, low latency, and cost-effective computing solutions.

However, a challenge with adopting and implementing Gen-Z communication models is that not all of the features and functionalities provided by existing physical server configurations are available with Gen-Z fabric solutions.

BRIEF DESCRIPTION OF THE DRAWINGS

So that the manner in which the recited features, advantages and objects of the present disclosure may be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

In the following, reference is made to examples or embodiments of the inventive concept in this disclosure. However, it should be understood that the inventive concept is not limited to described examples or embodiments. Instead, any combination of the following features, elements, or functionalities, whether related to different embodiments or not, is contemplated by the inventors as a possible combination that may be used to implement and practice an aspect of the present innovation. Furthermore, various examples or embodiments of this disclosure provide advantages over the prior art. However, although these examples or embodiments may achieve advantages over other possible solutions and/or the prior art, whether or not a particular advantage is achieved by a given example or embodiment is not intended to be limiting on the scope of the present disclosure. Therefore, the following aspects, features, functionalities, examples, embodiments, and advantages are intended to be merely illustrative and are not considered elements or limitations of the appended claims, except where explicitly recited therein. Similarly, reference to "the invention" or "the innovation" are not be construed as a generalization of any inventive subject matter disclosed herein and shall not be considered to be an element or limitation of the appended claims except where explicitly recited therein.

Figure 1:
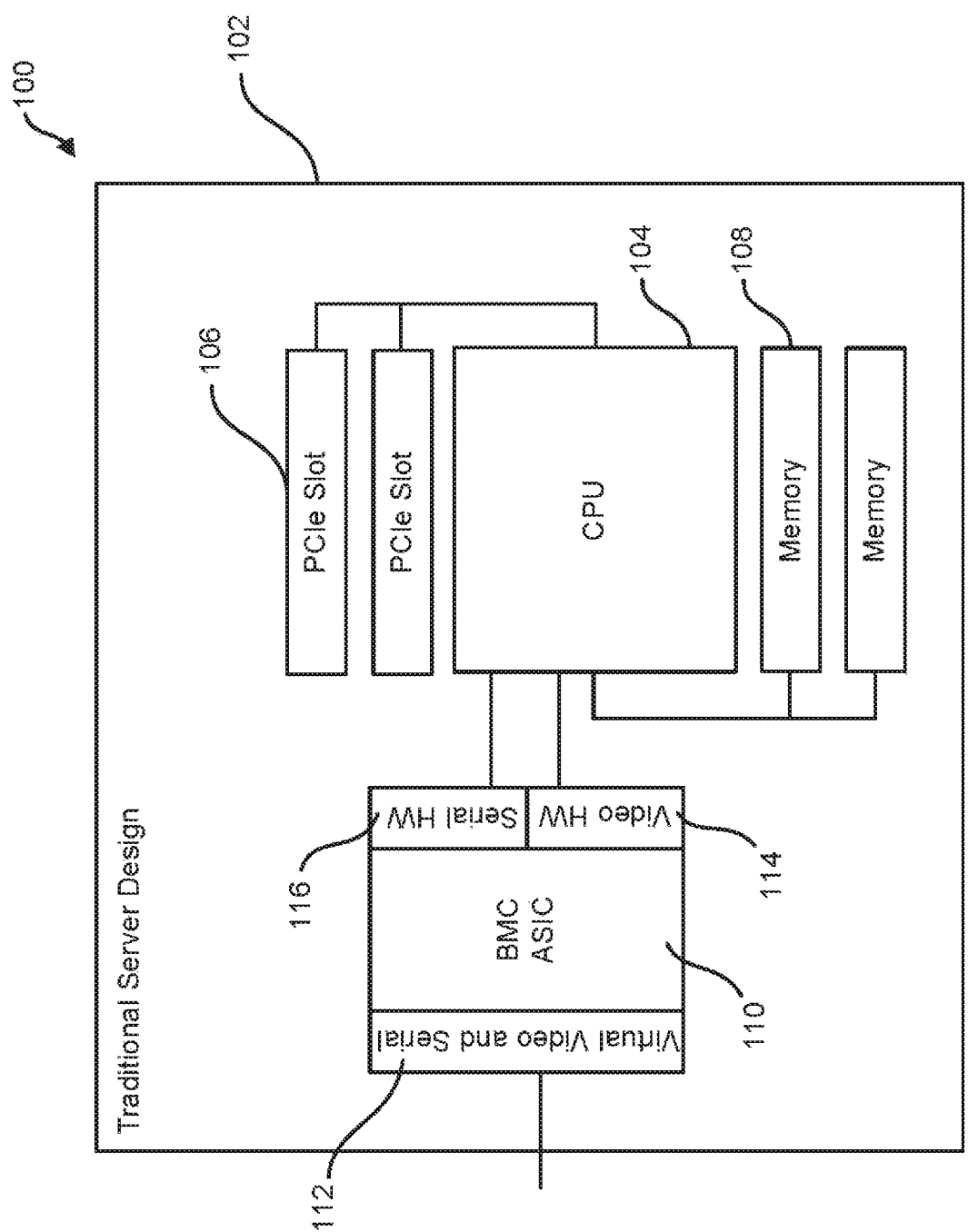
FIG. 1 illustrates an example physical server.

FIG. 1 illustrates an example physical server configuration 100 that includes a computing device or assembly 100 that has two central processing units (CPUs) 104, two memory units 108, two peripheral component interconnect express (PCIe) units, a video device or card 114, a serial device or card 116, and an ASIC baseboard management controller (BMC) 110 that includes a virtual video and serial I/O 112. BMC 110 provides the control and management mechanism in the intelligent platform management interface (IPMI) architecture and is typically a specialized microcontroller embedded on the motherboard of a computer or server 102. BMC 110 manages the interface between system-management software and platform hardware, and further, BMC 110 provides an avenue for administrators to direct serial connect to computing device 102 to implement corrective actions, such as resets, installs, updates, troubleshooting, etc. As such, the BMC 110 is the primary administrator interface for interacting with the computer or server architecture 100 components.

The example physical server configuration 100 illustrated in FIG. 1 dictates that users must find a server configuration 100 design that fits their specific workload as closely as possible, as the system components 102, 104, 106, 108 are essentially preselected by the manufacturer as a physically bound package. Capacity on any individual component, such as CPU 104, memory 108, or storage is wasted if the customer workload does not match the available hardware configuration capability. The example server configuration 100 shows components that are physically bound to a CPU 104 association in a shared computing device assembly 102 or enclosure. The placement of the BMC 110 in server configuration 100 is straightforward, as the BMC 110 typically belongs on the same physical board as the CPU 104, and as such, the BMC 110 is physically bound to the CPU 104 and related components.

The Gen-Z communication model provides a universal system interconnect that allows computing components that are traditionally physically bound into a static system design to instead be independent freely interchangeable components until configured to operate as a single Gen-Z functional entity. The implementation of a single functional entity communicating through a Gen-Z fabric allows computing components such as processors, memory, accelerators, networking devices, etc. to communicate with any other computing component in communication with the fabric as if the computing components were communicating with their own local memory. This type of fabric-based configuration is referred to in Gen-Z as memory-semantic fabric configuration and throughout this disclosure reference to Gen-Z can be interpreted to mean a memory-semantic-type fabric configuration that is not Gen-Z standard specific. A memory semantic fabric handles all inter component communications as memory operations, such as load/store, put/get, and atomic operations typically used by a processor. Memory semantics are optimal at sub-microsecond latencies from CPU load command to register store. Memory-semantic fabric configurations are unlike storage accesses which are block-based and managed by complex, code intensive, software stacks. With memory-semantic fabric-based Gen-Z architecture configurations, resources such as CPUs, memory type devices, video cards, GPU cards, and I/O cards may be designed to be unbound by way of sharing a common slot type that connects them as peers via Gen-Z fabric switches.

Figure 2:
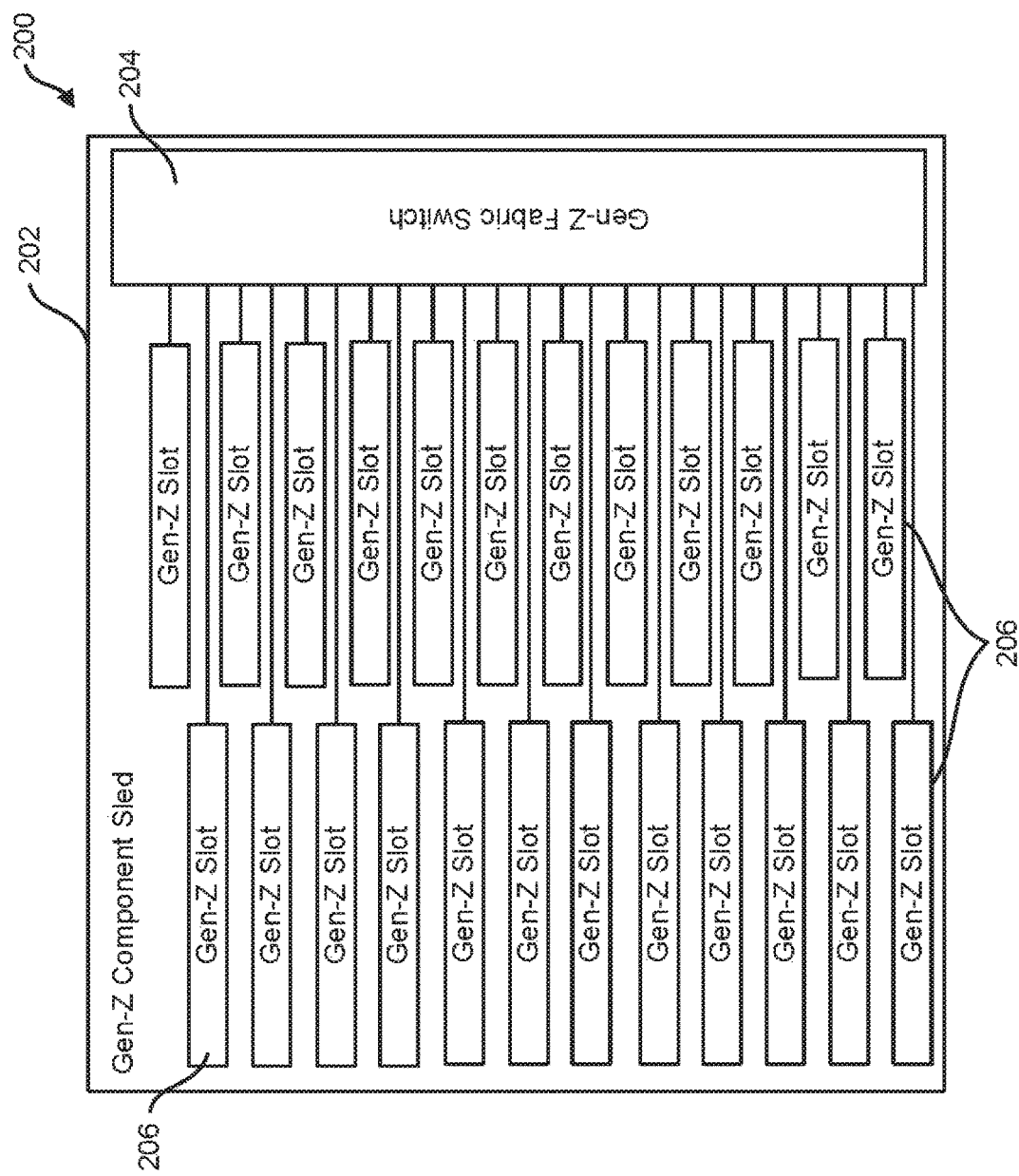
FIG. 2 illustrates an example empty hardware sled.

FIG. 2 shows an example hardware sled 200 having a fabric switch 204 and a plurality of (empty) slots 206, wherein each slot 206 is configured to hold an individual (or combination) computing resource, such as processing devices, memory, etc. The embedded Gen-Z fabric switch 204 onboard sled 200 may be a Gen-Z switch and may be electrically connected to each slot 206 in the architecture. Electrical connection between the fabric switch 204 and each slot 206 allows for bidirectional communication between any two slots 206 in the architecture via the fabric switch 204. The example sled 200 configuration with the onboard fabric switch 204 allows for installation of any ratio of CPUs to memory, CPUs to GPUs, or CPUs to storage, thus allowing the sled configuration 200 to be set up to exactly match any end user's workload requirements. This flexibility allows for less waste and optimal performance as the computing devices can be specifically designed and balanced to support various workload profiles. In such a Gen-Z based architecture, a composability manager enables each of the computing resources to be collectively bound together into a unique computing resource that behaves like a traditional server but is implemented by hardware components that live as peers on a unified fabric.

One challenge presented by the example sled 200 and various Gen-Z fabric configurations is that the functionality of the legacy onboard BMC is lost, which removes popular administrative tools such as remote serial console and remote keyboard/video/mouse (KVM) sessions. The lack of these functionalities impedes acceptance and adoption of memory-semantic fabric configurations. Therefore, an example configuration of the present disclosure provides memory-semantic fabric configuration that includes legacy-type serial console and remote KVM capability via a composable component with all connections happening over a fabric that may be a Gen-Z fabric.

Figure 3:
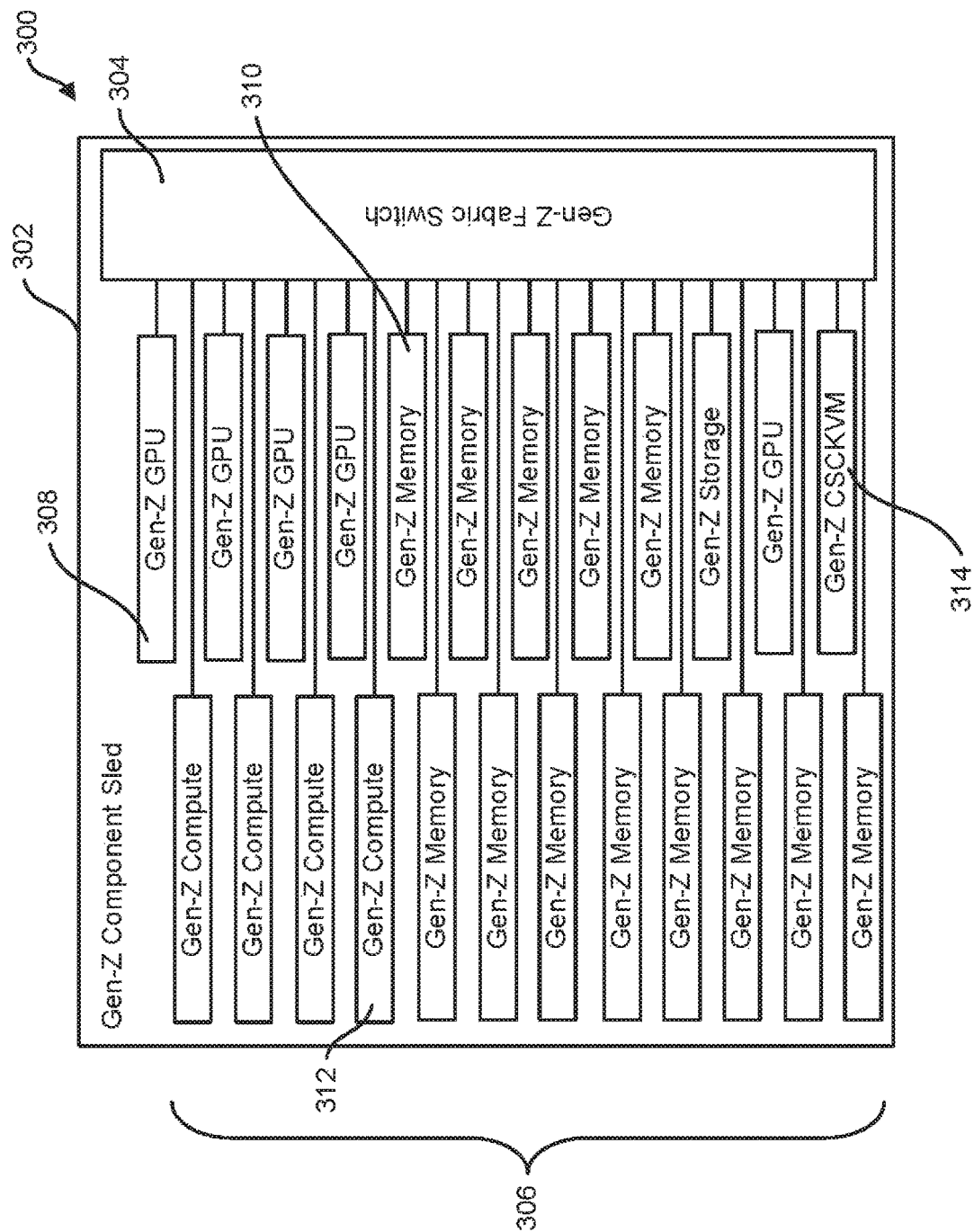
FIG. 3 illustrates an example populated hardware sled with a composable serial console and KVM.

FIG. 3 illustrates an example populated hardware sled 300 with each slot 306 occupied by components such as GPU 308, memory 310, compute modules 312, and a composable networked serial console and KVM 314 (CSC KVM). The components of the sled 300 may be Gen-Z or other memory-semantic fabric components. The example fabric-based configuration in FIG. 3 illustrates there is no clear placement option for a traditional CPU bound BMC in the sled 300 architecture. If the BMC were fixed to the component sled 300, it would go unused for various configurations, thus wasting resources and increasing capital expense. Similarly, if the BMC were fixed with each CPU 308, it would again end up going unused when multiple systems are composed into the same functional entity resulting in unused hardware The example sled 300 configuration in FIG. 3 illustrates a CSC KVM 314 that itself is a Gen-Z or memory-semantic fabric compatible component that occupies a slot 306 in the sled 300 and is in communication with each of the other slots 306 through the fabric switch 304, which may be a Gen-Z fabric switch. As a Gen-z or memory-semantic fabric component, the CSC KVM 314 can physically plug into any slot 306 in the component sled 300. The CSC KVM 314 may also be composed into one or more functional entities and since the fabric 304 may extend across multiple switches, the example configuration shown in FIG. 3 provides the ability scale to a large number of functional entities, thus reducing the overall cost amortization for the end user.

Figure 4:
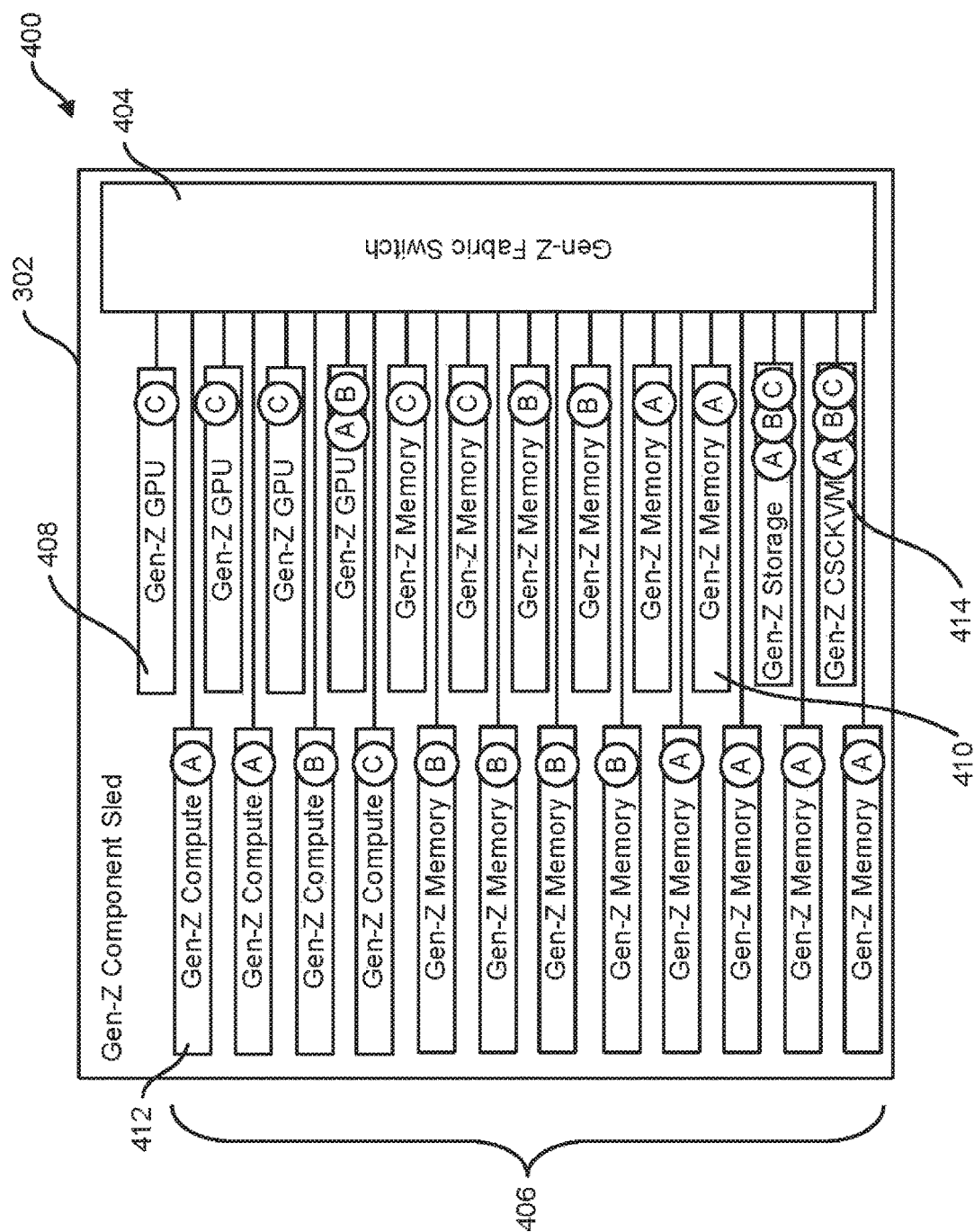
FIG. 4 illustrates an example populated hardware sled with a composable serial console and KVM with grouped logical functional entities.

FIG. 4 illustrates an example populated hardware sled 400 having an CSC KVM 414 with grouped logical functional entities shown. Again, the components of the example architecture shown in FIG. 4 may be Gen-Z or memory-semantic fabric compatible components. The hardware sled 400 with slots 406 occupied by components such as GPU 408, memory 410, compute modules 412, and an CSC KVM 314. The example logical functional entities labeled as system "A", system "B", and system "C" in the hardware sled 400 are what a typical external composability manager would bind together into a physical system architecture. In the present example, these systems are grouped together through the Gen-Z or memory-semantic fabric switch 404. From the perspective of a local operating system, compositions "A", "B", and "C" behave as traditional individual servers.

Figure 5:
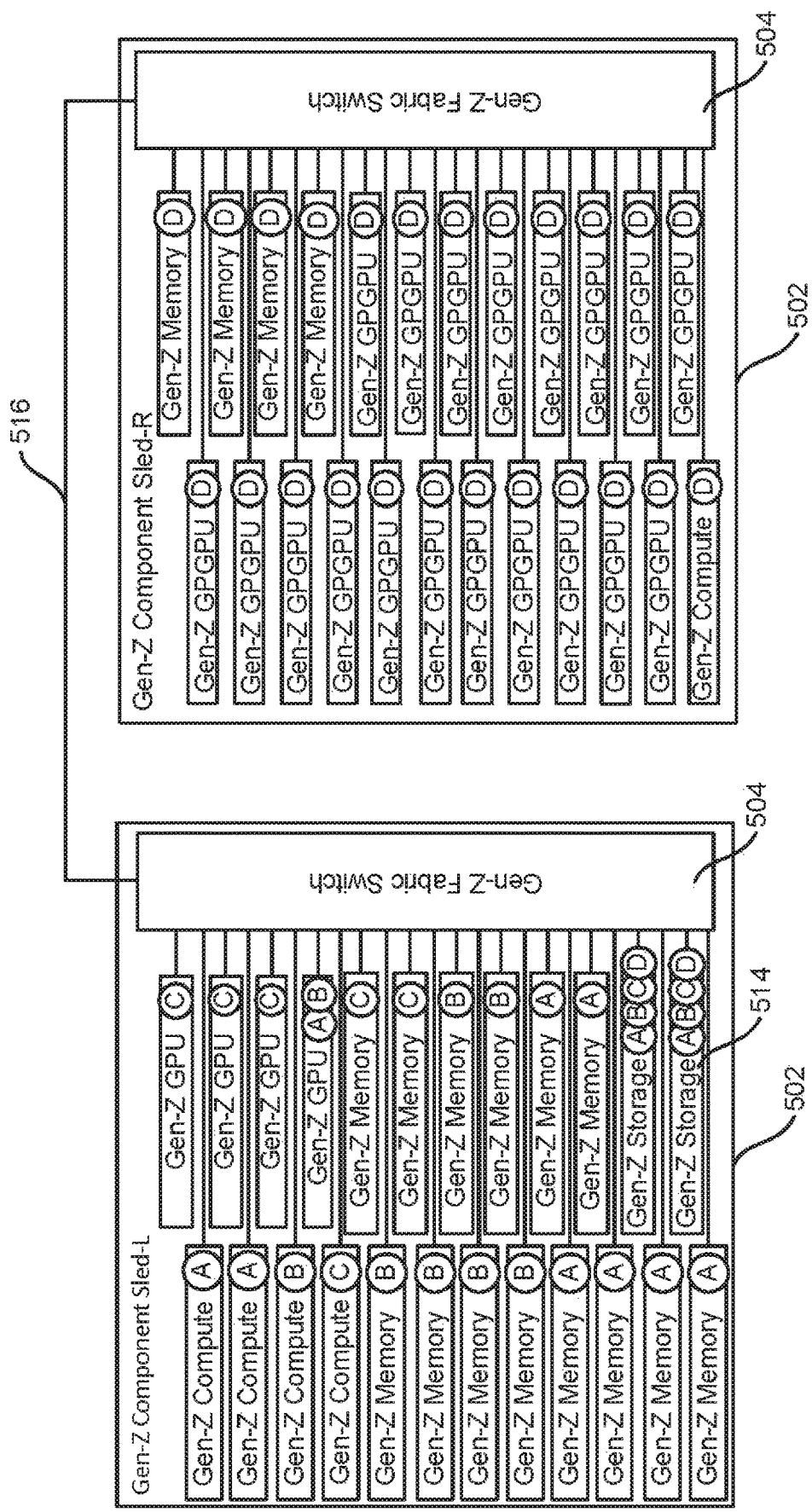
FIG. 5 illustrates an example architecture with two component sleds connected together.

FIG. 5 illustrates an example architecture with two Gen-Z component sleds 502 connected together by a Gen-Z link 504. In this example architecture the two Gen-Z component sleds 502 share a single CSC KVM 514 that is logically shared between functional entities A, B, C, and D, where each letter represents a dynamically allocated composition of resources that are granted access to each other on the fabric. Therefore, each of the functional entities on the individual sleds 504 are in electrical communication with the CSC KVM 514 through one or both of the Gen-Z fabric switches 504. Specifically, a functional entity in the right-side R component sled 502 will communicate with the CSC KVM 514 through the Gen-Z fabric switch 504 on the right-side sled 502, the Gen-Z link 516, and the Gen-Z fabric switch 504 on the left side sled 502. A component on the left side sled 502 will communicate with the CSC KVM 514 through the left side Gen-Z fabric switch 504. In the example configuration shown in FIG. 5, the Gen-Z components may also be memory-semantic fabric compatible components. Further, any component may communicate with any other component of the same letter anywhere on the fabric, as these component groups are a composition of components.

The example system architecture of this disclosure, as shown in the example configurations in FIGS. 2-5, provides traditional serial console server capability with regard to the BMC functionality, but instead of populating buffers from data read from local hardware UARTs connected to real serial connections, the example system architectures of the disclosure include a custom chip (ASIC) residing on each CPU component that takes output from the serial interfaces and maps it to allocated Gen-Z address space for the system. Similarly, input received from the serial console server service is written to another region in the system architecture's memory that is polled frequently by the custom ASIC on the CPU component. When new data is discovered by the custom ASIC, that data behaves like a traditional UART and interrupts the CPU to notify that new data needs to be read and processed.

Figure 6:
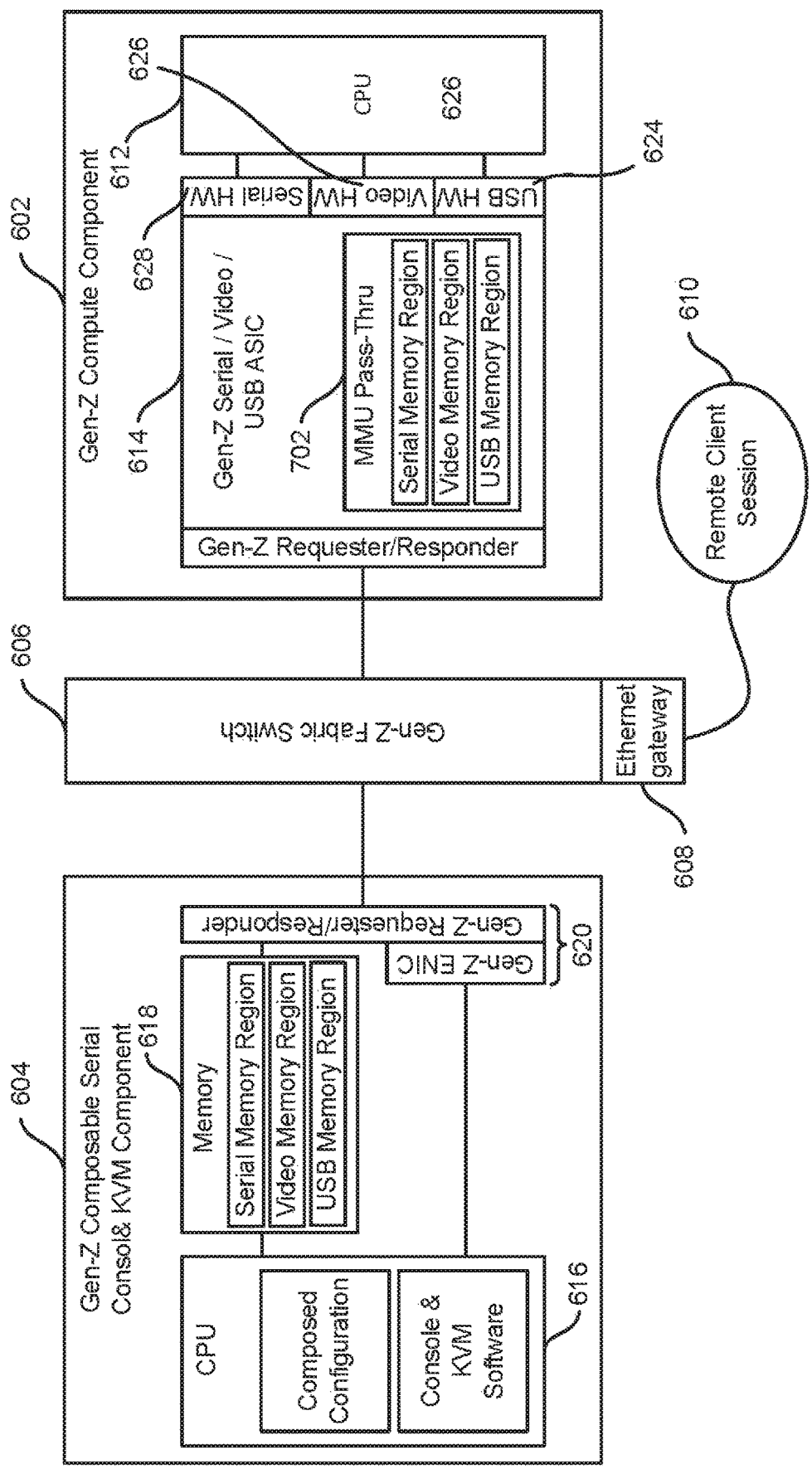
FIG. 6 illustrates an example architecture configuration with a KVM communicating with a compute component.

FIG. 6 illustrates an example architecture configuration with a Gen-Z KVM communicating with a Gen-Z compute component, and specifically, the hardware to memory path through the Gen-Z fabric for serial data to/from the CPU component ASIC is shown. The example architecture and communication path of FIG. 6 includes a compute component 602 having a CPU 612 and a serial/video/USB (SVU) ASIC 614 in communication with CPU 612. The SVU ASIC 614 is in communication with the onboard CPU 612 and with a fabric switch 606, which may be a memory-semantic fabric switch or a Gen-Z switch. The fabric switch 606 includes an Ethernet gateway 608, which is generally a device or module that supports seamless connectivity between composition based systems using a memory semantic fabric and legacy Ethernet network. The Ethernet gateway is the intermediary between, for example, servers and Ethernet devices that typically support flexible configuration of Layer 2 bridging.

The example architecture illustrated in FIG. 6 further includes a CSC KVM 604 in communication with the fabric switch 606. The CSC KVM 604 includes a CPU 616 in communication with a memory 618 that is in communication with an Ethernet network interface controller (eNIC) and requestor/responder 620. The CPU 616 of the CSC KVM 604 may include software running or being executed thereon, where the software is configured to establish and support the operation of the console and KVM functionality. CPU 616 may include a composed configuration module configured to allocate portions of memory 618 to specific devices or operations, such as a serial memory space, a video memory space, and a USB memory space. Alternatively, memory allocation on the CSC KVM 604 and other devices or slots in the architecture may be controlled by composability manager running remotely or on the fabric. An example composability manager is HPE's OneView server management technology which provides composability facilities typically through an Ethernet port to remotely connected servers with BMCs such as HPE's Integrated Lights Out (iLO).

Memory 618 may include a serial memory region configured to support data, instructions, etc. related to serial data/functionality, a video memory region configured to support the video output of the CSC KVM 604, and a USB memory region configured to support USB port or communication data/functionality. Each of the memory spaces or regions defined in memory 618 are allocated to specific types of operations conducted by the CSC KVM 604, e.g., serial, video, and USB operations. The eNIC and requester/responder 620 are also in communication with the CPU 616 and receive commands therefrom and provide data thereto. The example architecture illustrated in FIG. 6 enables an administrator to initiate remote session 610 to connect to any component in the architecture that is in communication with the fabric switch 606 through CSC KVM 604's functional capability. Therefore, connection through remote client session 610 allows connection to the CSC KVM 604 which in turn operates as the interface for the remote user to connect to components or slots in the system architecture that are in communication with the fabric switch 606, which in the example configuration encompasses every component in the architecture.

The SVU ASIC 614 further includes hardware to communicate with the CPU 612. For example, the CPU 612 has numerous input and output pins and a relatively small group of the CPU output pins have USB data being output thereon. Therefore, in order to connect to and communicate with the CPU 612 USB pins, a USB hardware translator 624 is included in the SVU ASIC 614. The hardware translator operates to convert the output signals from the CPU into a format suitable for storage in memory, which for Gen-Z fabrics is a flat addressable memory value that may be a fixed-size address pointer (e.g. 32 bit, 64 bit, etc. . . . ). The hardware translator may further convert flat addressable memory values into input signals the CPU 612 is able to receive. Similarly, a video hardware translator 626 and a serial hardware translator 628 may be included in the SVU ASIC 614 to translate video and serial data coming from output pins of the CPU 612 into a data or address format suitable for storage in memory and for use in a Gen-Z fabric and vice versa. The hardware translators 624, 626, 628 translate signals received from the CPU 612, which may be analog signals, into digital addressable memory that can then get stored in the MMU pass-through 702 assigned memory regions for each particular type of data.

Figure 7:
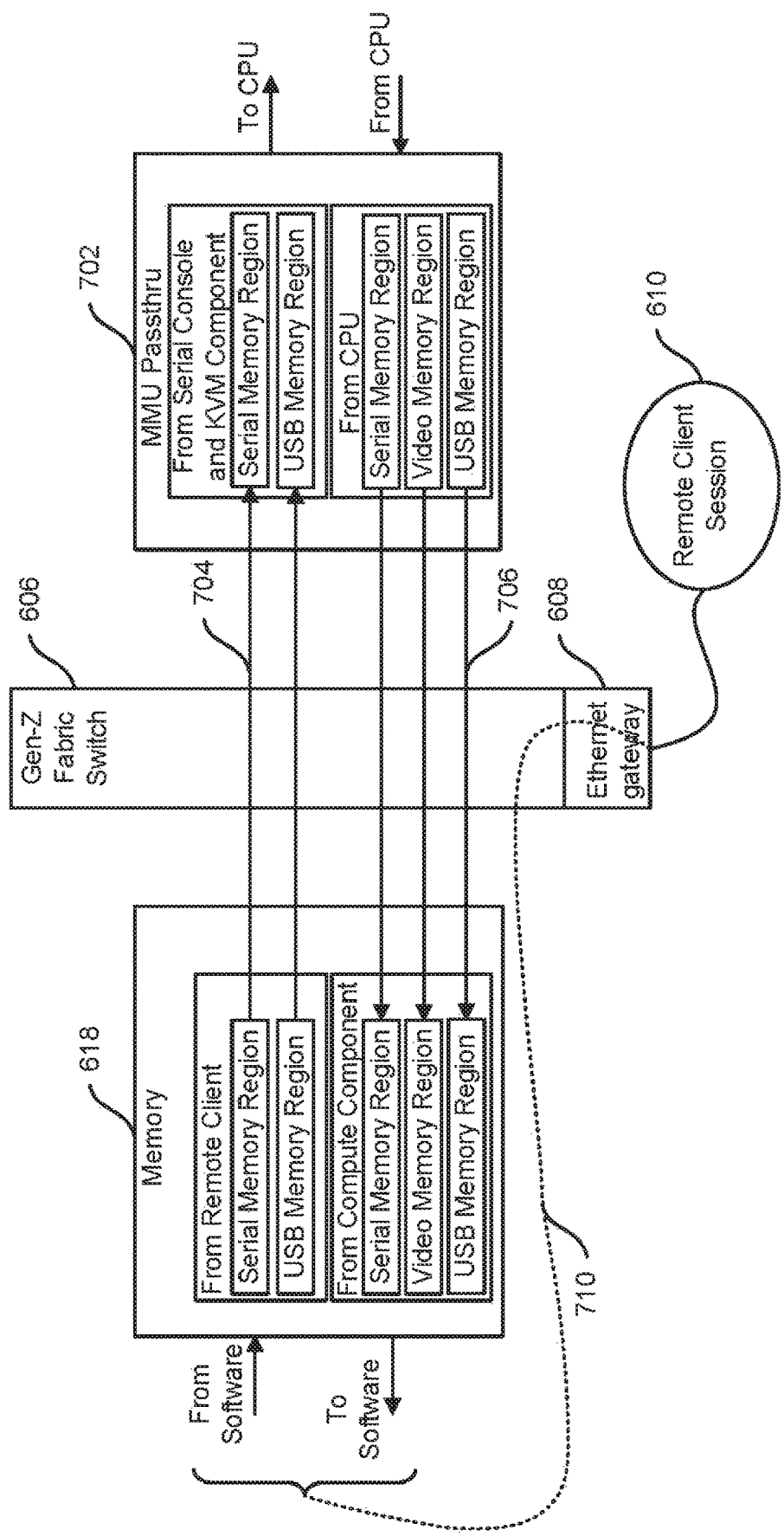
FIG. 7 illustrates a memory-centric view of an example architecture including representations of serial input and output data moves between the components and the software implementing the serial console.

FIG. 7 illustrates a memory-centric view of an example architecture including representations of serial input and output data moves between the components and the software implementing the serial console. The architecture illustrated in FIG. 7 is an example zoom in on components shown in FIG. 6, specifically, a memory management unit (MMU) pass-through 702 portion of the SVU ASIC 614 and the memory 618 of the CSC KVM 604. The arrows between the memory 618 and the MMU 702 represent the data traffic between the respective components. More particularly, arrows 704 represent data traffic from left to right (from memory 618 to MMU 702). The two arrows 704 in the example architecture represent serial and USB traffic. Similarly, the three arrows 706 represent traffic originating in the MMU 702 and traveling to the memory 618. Each of arrows 704, 706 represent different unidirectional data traffic that travels from a component in one slot of the architecture to another component in another slot of the architecture via the fabric switch 606.

When a remote session 610 is established, the example configuration shown in FIG. 7 populates a designated region or area in memory 618 with data corresponding to the allocated memory region or area. For example, if a remote session 610 sends serial data, then the serial data is transmitted through the Ethernet Gateway 608 and communication lines 710 of the switch fabric to the slot containing the CSC KVM 604 and the accompanying memory 618. Then the serial data is written to a designated region or area of memory 618 specifically allocated for serial data. Therefore, as the data is received from software emulating the terminal session for the remote client session 610, it is stored in the designated memory area 618 corresponding to the data type, which is typically serial or USB. Areas of memory 618 may be allocated for other types of data or information needed to support a remote client session. Once the data is written to the designated region or area of memory 618, the data is transmitted or pushed across the fabric switch 606 to a corresponding pre-allocated and designated memory region or area in the MMU pass-through 702 where the CPU is able to receive and process the data or instructions stored in the MMU pass-through memory. This same operation of data or instructions coming into the architecture from a remote client session 610 and being put into a predetermined memory space in the CSC KVM 604 memory 618 so that the data or instructions can then be transmitted across the fabric switch 606 into CPU 612 memory on board the SVU ASIC 614 for processing by the CPU 612 may be accomplished for any data or instruction type, such as USB, Serial, Video, or other data types.

Similarly, when the CPU 612 needs to push data or instructions to the remote client session, the data or instructions are stored in a designated memory region or area in the SVU ASIC 614, and specifically, in a predesignated memory region in the MMU pass-through. The data or instructions are sent from the MMU memory through a requestor/responder onto the fabric and through the fabric switch 606 where the data or instructions are received and stored in the memory 618 of the CSC KVM 604 and thereafter the data or instructions are pushed out to the remote client session 610 through the fabric switch 606 and the Ethernet gateway 608.

In the example architecture shown in FIG. 7, the inbound data path 704, i.e., the data path originating with the remote client session 610 and terminating with the CPU 612, includes paths for serial data and USB data. The outbound data path 706, i.e., the data path originating with the CPU 612 and terminating with the remote client session 610 includes paths for serial data, USB data, and video data, which is generally rasterized. As such, the data flow for the serial and USB data is bidirectional where the data flow for rasterized video data is unidirectional (outbound), as video data generally doesn't provide input information for a server console.

Figure 8:
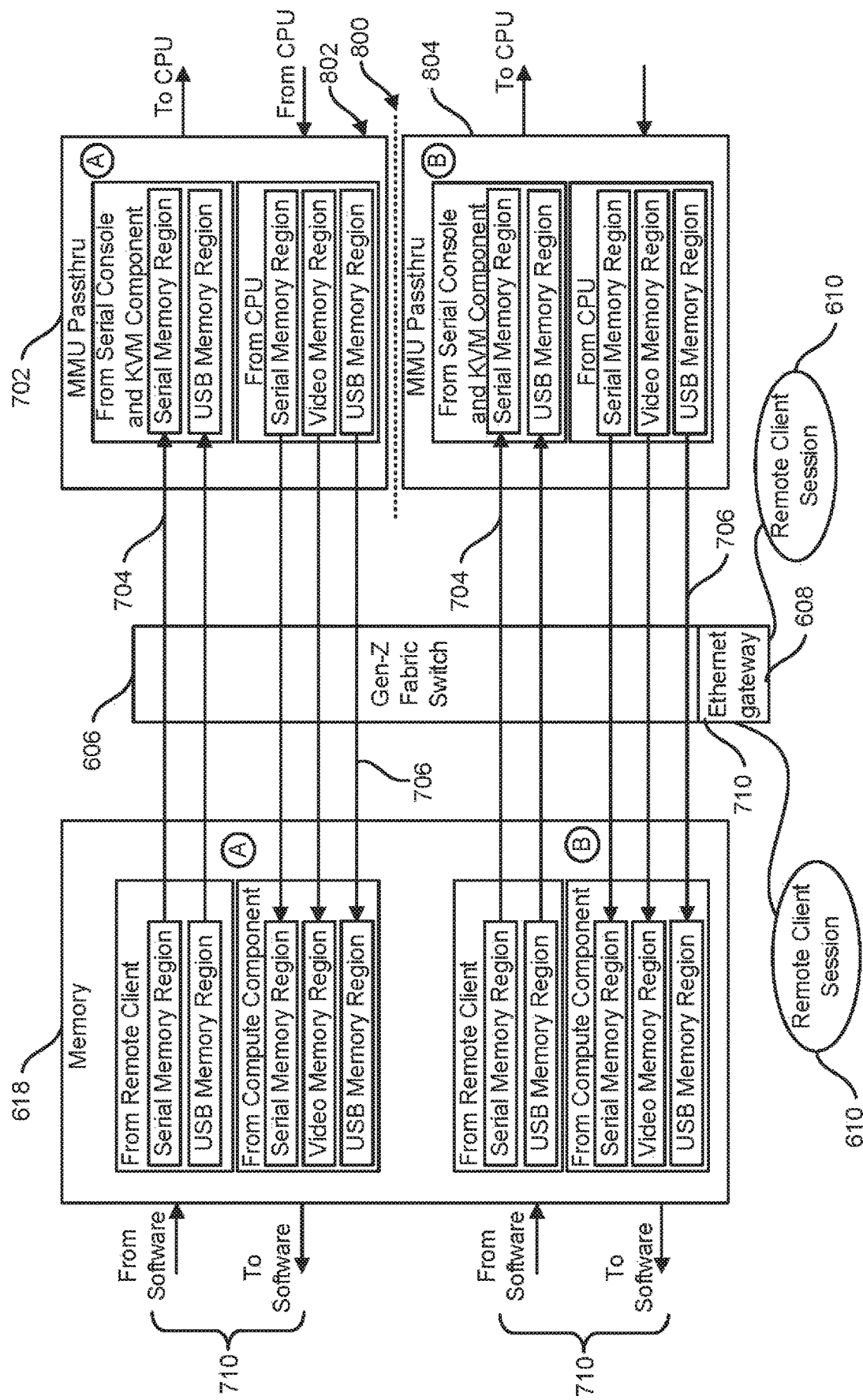
FIG. 8 illustrates a memory-centric view of an example architecture having two simultaneous remote client sessions running.

FIG. 8 illustrates a memory-centric view of an example architecture having two simultaneous remote client sessions running. FIG. 8 illustrates how multiple composed systems are mapped to different memory regions for their serial/USB/video memory on the console server and KVM component. Likewise, the Gen-Z mapping back to the composed systems ensures that serial input intended for composed system B is written to the "From Remote Client" (B) memory region on the console server and KVM component so that it can then be addressable by the custom ASIC and presented to the CPU. The same is true of video and keyboard/mouse inputs. In the example architecture, a single CSC KVM 604 (mainly the memory 618 thereof) communicates with multiple entities across the fabric. Each entity across the fabric may have dedicated areas of memory allocated to specific data types that correspond to the memory mapped in the CSC KVM 604's memory 618. Thus, the example architecture shown in FIG. 8 illustrates that a single CSC KVM 604 on the left side of the architecture has the capability to map to multiple entities on the right through the fabric. Specifically, the dotted line 800 illustrates a divide between two separate components 802, 804 that are each in communication with the CSC KVM 604. In sum, the example of FIG. 8 illustrates how multiple remote sessions or connections can be initiated through the single CSC KVM 604 and the associated memory 618 to communicate with multiple components in the example architecture through the fabric switch 606.

The allocation of the memory regions for the specific data types is handles at the time the system is composed. For example, when a user initially sets up or puts together a server system, the user composes the system known as A, for example, which may include any number of components housed in slots on the fabric. Therefore, at the time the service is composed, there is essentially a logical boundary that groups the component slots together into a system or server. At the time of composition of the system, the memory will be allocated on the CSC KVM 604. The memory allocation may be controlled by a composability manager device or software configured to set up and initialize components into groups of components that collectively form an operational server or computing device on a Gen-Z fabric, for example.

Figure 9:
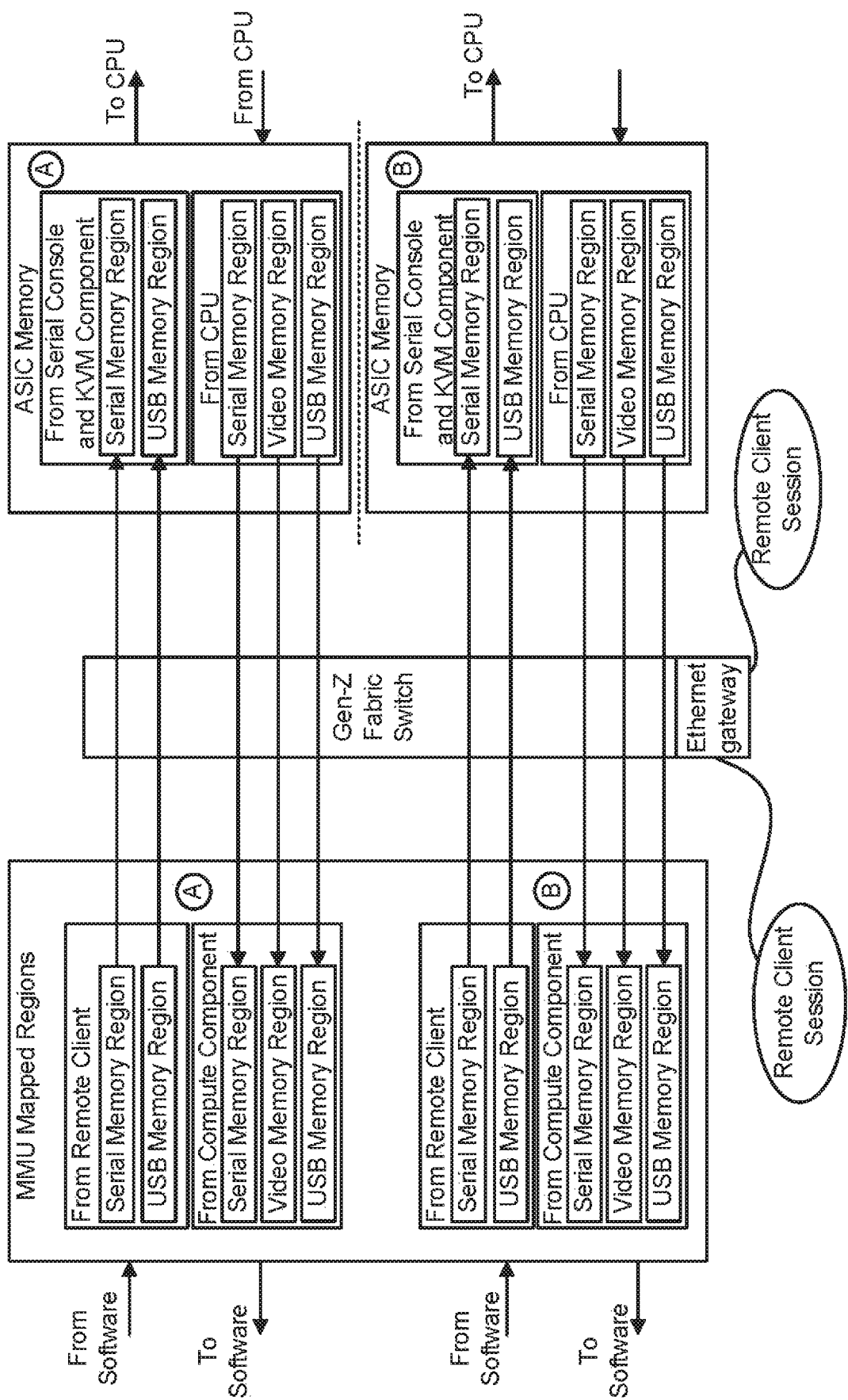
FIG. 9 illustrates an example Gen-Z architecture of the disclosure.

FIG. 9 illustrates another example architecture, where a user can cost reduce the architecture by integration. FIG. 9 shows the reversal from FIG. 8 where the memory mapping occurs on the composable serial console and KVM component and the actual Gen-Z memory resides within the custom ASIC on each compute. Also, it's easy to understand that the composable serial console and KVM component be given access to a special form factor slot in the chassis that enables it to surface a physical USB port, Display port, and serial cable (or some combination) so that it becomes a physical attachment point for a datacenter crash cart. This would enable technicians in the datacenter to roll a cart with a monitor, keyboard, and mouse up to each drawer and potentially access all composed system on the Gen-Z fabric (even spanning multiple component sleds). For example, several of the components in the example of FIG. 9 are integrated together when compared to the architecture shown in the example of FIG. 6. For example, even though the components in FIG. 9 are inside each other, they can still be separate. There could be a serial hardware piece, a video hardware piece, USB hardware piece, and then architecture in FIG. 9 illustrates that each of these components can be merged into a signal ASIC that accomplishes all of the same functionality that is not as separated as the example shown in FIG. 8 where just the MMU pass throughs are separated. This level of integration will provide significant cost and space reduction.

Example architectures of the disclosure offer a novel capability to implement remote KVM support with video display into a memory-semantic communication architecture such as Gen-Z. The same custom ASIC that presents a UART to a CPU and handles virtual serial memory mapping may also present a basic video device to the CPU. Similar to the way that the serial behavior is mapped to the invention, so may video data be written to the ASIC. The ASIC rasterizes video and then writes it through its Gen-Z MMU pass-through that results in remotely writing to the memory allocated for the given composition on the component by way of the high speed Gen-Z fabric. The ASIC will refresh the raster at a reasonable rate to mimic true video. To improve network performance, this rate may be decoupled from the rate at which the CPU writes the video image to the ASIC. This would be several times per second. Remote KVM clients connected via a session assigned to the given composition will be able to use traditional remote viewing software to see the video display over a remote network.

Example architectures of the disclosure offer a novel capability to implement USB keyboard and mouse as part of the remote KVM support into a memory-semantic communication architecture such as Gen-Z. Just as the custom ASIC presents serial capability to the CPU, it may also present a universal serial bus with standard keyboard and mouse devices attached. Inputs from the user may be received by the KVM client application and then mapped to a composed memory region on a component. The custom ASIC on the compute module can read this allocated USB input memory at a frequent rate and map values into key presses and mouse motions sent to the CPU. FIG. 6 shows the hardware to memory path through the Gen-Z fabric for USB keyboard and mouse data to/from the CPU component ASIC. FIG. 7 shows a memory-centric view of how USB keyboard and mouse input and output data moves between the components and the software implementing the serial console.

Example architectures of this disclosure may use software executing on the Gen-Z serial console & KVM component to handle being composed (bound) into a system and to create a client that can be loaded remotely through a Gen-Z ENIC and Ethernet Gateway. This allows a remote session to attach over a standard Ethernet network and log in to one or more of the composed systems to access the serial console and remote KVM functionality for each of the composed systems. To the remote client, it appears they are connecting to a standard networked KVM or serial console server that is physically connected to one or more traditional servers. In reality, the composed systems are logical in nature and the connections for serial and keyboard/video/mouse are entirely done by memory transfers over the fabric.

In another example of the disclosure, the memory for the serial, video/display, and keyboard mouse registers are relocated from the composable serial console and KVM component and onto the custom ASIC in each compute card. Due to the method by which Gen-Z allows for access to remote memory, the memory only needs to exist in one place. Putting the memory into the custom ASIC would allow for better scalability of the solution since the composable serial console and KVM component would not be memory-limited as to how many clients it could simultaneously support. It would simply read/write what it needed through the Gen-Z fabric to the memory on the custom ASIC on the computer cards.

Figure 10:
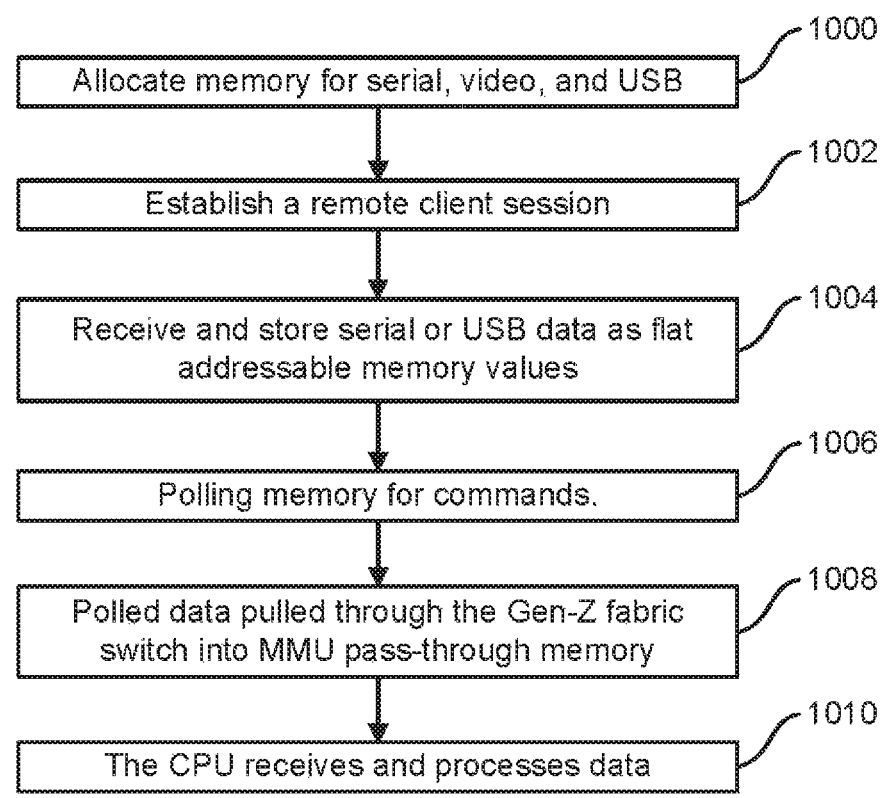
FIG. 10 illustrates an example method of the disclosure.

FIG. 10 illustrates an example method of the disclosure. The example method operates to provide CSC to a Gen-Z architecture component using a method that begins at 1000 with allocating dedicated memory space for each of serial, video, and USB data in a memory of an CSC component positioned in a first slot of a Gen-Z sled. The method continues to 1002 where it establishes a remote client session to the CSC through an Ethernet gateway and Gen-Z fabric switch. At 1004 the example method receives serial or USB data in the CSC from the remote client session and stores the serial or USB data in a corresponding allocated dedicated memory space as flat addressable memory values. At 1006 the example method polls, by a component in a second slot of the Gen-Z sled, the dedicated memory space of the CSC to pull the serial or USB data from the allocated dedicated memory space on the CSC to a corresponding allocated memory on the component in the second slot for processing by a CPU on the component in the second slot. At 1008 any data in the polled memory locations is pulled through the Gen-Z fabric switch into MMU pass-through memory in communication with the CPU. The CUP then receives the data from the MMU pass-through memory and processes the data accordingly at 1010. Once the CPU processes the data, outputs may be generated and passed back through the system components in reverse order to be presented to the remote client session.

One embodiment of the invention is implemented as a program product for use with a computer system such as, for example, the computer or server system shown in FIGS. 1-6. The program(s) of the program product define functions of the examples, including the methods described herein, and can be contained on a variety of non-transitory computer-readable media. In general, the routines executed to implement the examples of the disclosure may be part of an operating system or a specific application, component, program, module, object, or sequence of instructions. The computer program of the present disclosure typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific example of the disclosure. However, it should be appreciated that any particular program nomenclature herein is used merely for convenience.

In the preceding, reference is made to examples presented in this disclosure. However, the scope of the present disclosure is not limited to specific described examples. Instead, any combination of the following features and elements, whether related to different embodiments or not, is contemplated to implement and practice contemplated examples. Furthermore, although examples disclosed herein may achieve advantages over other possible solutions or over the prior art, whether or not a particular advantage is achieved by a given example is not limiting of the scope of the present disclosure. Thus, the preceding aspects, features, examples and advantages are merely illustrative and are not considered elements or limitations of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more non-transitory computer readable medium(s) having computer readable program code embodied thereon.

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

Examples disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to examples of the disclosure other and further examples of the disclosure may be devised without departing from the basic scope thereof, and the scope thereof is determined by the claims that follow.

What is claimed is:

1. A memory-semantic networked serial console, comprising:
   a sled having a plurality of slots;
   a memory-semantic fabric switch in communication with each of the plurality of slots; and
   a memory-semantic composable serial console (CSC) positioned in one of the plurality of slots and in communication with the fabric switch, the CSC to receive data from a remote client session, store the data in a corresponding allocated dedicated memory space, and transmit the data from the allocated dedicated memory space for processing by a CPU on the component in a second slot.

2. The memory-semantic networked serial console of claim 1, further comprising a keyboard, video, mouse (KVM) component position on one of the plurality of slots.

3. The memory-semantic networked serial console of claim 2, wherein the CSC and KVM are on the same component in a single slot.

4. The memory-semantic networked serial console of claim 2, where the KVM is positioned in the same slot as the CSC.

5. The memory-semantic networked serial console of claim 1, wherein the CSC further comprises:
   a memory having a first dedicated area for serial data, a second dedicated area for video data, and a third dedicated area for USB data; and
   a CSC central processing unit (CPU) in communication with the memory and the memory-semantic fabric switch.

6. The memory-semantic networked serial console of claim 1, wherein the memory-semantic fabric switch comprises a Gen-Z fabric switch and the memory-semantic CSC comprises a Gen-Z CSC.

7. The memory-semantic networked serial console of claim 6, further comprising a memory management unit (MMU) pass-through in communication with a component CPU in each of the plurality of slots.

8. The memory-semantic networked serial console of claim 7, further comprising a translator positioned between the MMU pass-through and the component CPU.

9. The memory-semantic networked serial console of claim 7, further comprising an Ethernet gateway in communication with the Gen-Z fabric switch and configured to provide remote client session communication to the Gen-Z fabric switch.

10. A method for providing CSC to a Gen-Z architecture component, comprising:
    allocating dedicated memory space for each of serial, video, or USB data in a memory of an CSC component positioned in a first slot of a Gen-Z sled;
    receiving serial or USB data in the CSC component from a remote client session and storing the serial or USB data in a corresponding allocated dedicated memory space; and
    polling, by a component in a second slot of the Gen-Z sled, the dedicated memory space of the CSC component to pull the serial or USB data from the allocated dedicated memory space on the CSC component to a corresponding allocated memory on the component in the second slot for processing by a CPU on the component in the second slot.

11. The method of claim 10, further comprising the CPU generating and storing output data to the corresponding allocated memory on the component in the second slot.

12. The method of claim 11, wherein the output data comprises serial data, USB data, or video data.

13. The method of claim 12, wherein the output data from the CPU is translated into flat addressable memory values before being stored in the corresponding allocated dedicated memory space.

14. The method of claim 11, further comprising a computing component on the CSC component pulling the output data from the allocated memory to the dedicated memory space of the CSC for processing, wherein pulling occurs through a Gen-Z fabric switch.

15. The method of claim 14, further comprising outputting, from the computing component, the output data to the remote client session through the Gen-Z fabric switch and an Ethernet gateway.

16. The method of claim 11, further comprising the CSC component providing KVM capability to slots of the Gen-Z sled to the remote client session.

17. A non-transitory computer readable medium comprising computer executable instructions stored thereon, that when executed by a processor, cause the processor to perform a method for providing CSC to a Gen-Z architecture component, comprising:
    allocating dedicated memory space for each of serial, video, or USB data in a memory of an CSC component positioned in a first slot of a Gen-Z sled;
    receiving serial or USB data in the CSC component from a remote client session and storing the serial or USB data in a corresponding allocated dedicated memory space; and
    polling, by a component in a second slot of the Gen-Z sled, the dedicated memory space of the CSC component to pull the serial or USB data from the allocated dedicated memory space on the CSC component to a corresponding allocated memory on the component in the second slot for processing by a CPU on the component in the second slot.

18. The non-transitory computer readable medium of claim 17, further comprising:
    the CPU generating and storing output data to the corresponding allocated memory on the component in the second slot, wherein the output data comprises serial data, USB data, or video data and the output data is translated into flat addressable memory values before being stored in the corresponding allocated dedicated memory space;
    a computing component on the CSC component pulling the output data from the allocated memory through the Gen-Z fabric switch to the dedicated memory space of the CSC component for processing; and
    outputting, from the computing component, the output data to the remote client session through the Gen-Z fabric switch and an Ethernet gateway.

19. The non-transitory computer readable medium of claim 18, further comprising the CSC component providing remote client KVM access to all slots on the Gen-Z sled.

* * * * *